(12) United States Patent
Burgbacher et al.

(10) Patent No.: US 9,212,728 B2
(45) Date of Patent: Dec. 15, 2015

(54) GEAR ASSEMBLY FOR MOTOR VEHICLE

(71) Applicant: GKN Driveline Newton, LLC., Wilmington, DE (US)

(72) Inventors: Martin Burgbacher, Troy, MI (US); Bahman Haghshanas, Rochester, MI (US); Hans-Peter Nett, Sterling Heights, MI (US); Albert John Nielson, Jr., Plymouth, MI (US)

(73) Assignee: GKN Driveline Newton, LLC, Wilmington, DE (US)

( * ) Notice: Subject to any disclaimer, the term of this patent is extended or adjusted under 35 U.S.C. 154(b) by 0 days.

(21) Appl. No.: 14/302,554

(22) Filed: Jun. 12, 2014

(65) Prior Publication Data
US 2014/0315678 A1    Oct. 23, 2014

Related U.S. Application Data

(62) Division of application No. 13/013,589, filed on Jan. 25, 2011, now Pat. No. 8,790,211.

(60) Provisional application No. 61/282,339, filed on Jan. 26, 2010.

(51) Int. Cl.
*F16H 3/44* (2006.01)
*F16H 37/06* (2006.01)
(Continued)

(52) U.S. Cl.
CPC .. *F16H 3/44* (2013.01); *F16H 3/54* (2013.01); *F16H 37/046* (2013.01); *F16H 2200/0034* (2013.01); *F16H 2200/2005* (2013.01); *F16H 2200/2033* (2013.01)

(58) Field of Classification Search
CPC ...... F16H 3/78; F16H 3/44; F16H 2200/2033
USPC ......................... 475/303, 269, 296
See application file for complete search history.

(56) References Cited

U.S. PATENT DOCUMENTS 3,301,095 A    1/1967    Dotter
4,296,642 A    10/1981    Schetter
(Continued)

FOREIGN PATENT DOCUMENTS

GB    694861    7/1953
GB    842715    7/1960

OTHER PUBLICATIONS

Mucino; Victor H., et al; A Double Planetary Gear Train-CVT Transmission with Multiple Applications; pp. 91-100, ISSN: 00995908.

*Primary Examiner* — Ramya Burgess
*Assistant Examiner* — Lillian Nguyen
(74) *Attorney, Agent, or Firm* — Jennifer M. Brumbaugh; Reising Ethington P.C.

(57) ABSTRACT

A gear assembly for a motor vehicle includes first clutch configured to selectively couple an input shaft to an output shaft and a second clutch configured to selectively couple the input shaft to a planetary gear train. When the first clutch is activated and the second clutch is not activated, the input torque is transmitted from the input shaft to the output shaft such that the output torque relative to the input torque is a first gear ratio. When the second clutch is activated and the first clutch is not activated, the input torque is transmitted from the input shaft to the output shaft through the planetary gear train such that the output torque relative to the input torque is a second gear ratio. When neither the first clutch nor the second clutch are activated, the input torque is not transmitted from the input shaft to the output shaft.

17 Claims, 6 Drawing Sheets

(51) Int. Cl.
  *F16H 3/54* (2006.01)
  *F16H 37/04* (2006.01)

(56) References Cited

U.S. PATENT DOCUMENTS

| | | | |
|---|---|---|---|
| 4,334,440 A | 6/1982 | Fonck | |
| 4,409,859 A | 10/1983 | Yarnell | |
| 4,458,557 A | 7/1984 | Hayakawa | |
| 4,633,725 A | 1/1987 | Jones | |
| 5,450,767 A | 9/1995 | Willford et al. | |
| 5,613,587 A | 3/1997 | Baxter, Jr. | |
| 5,711,740 A * | 1/1998 | Bakowski | 475/303 |
| 5,980,413 A | 11/1999 | Anderson et al. | |
| 6,154,700 A | 11/2000 | Jones | |
| 6,258,009 B1 | 7/2001 | Thomas et al. | |
| 6,382,382 B1 | 5/2002 | Avny et al. | |
| 6,406,400 B1 | 6/2002 | Shih | |
| 6,523,657 B1 | 2/2003 | Kundermann et al. | |
| 6,685,595 B2 | 2/2004 | Ohkubo et al. | |
| 6,863,979 B2 | 3/2005 | Atarashi et al. | |
| 7,011,596 B2 * | 3/2006 | Haka | 475/285 |
| 7,246,692 B2 | 7/2007 | Braford | |
| 7,384,366 B2 * | 6/2008 | Kelley, Jr. | 475/296 |
| 2002/0033059 A1 | 3/2002 | Pels et al. | |
| 2003/0089569 A1 | 5/2003 | Antonov et al. | |
| 2004/0094381 A1 | 5/2004 | Versteyhe | |
| 2005/0090360 A1 | 4/2005 | Armstrong et al. | |
| 2005/0189195 A1 | 9/2005 | Heinrich et al. | |
| 2005/0284725 A1 * | 12/2005 | Bauer et al. | 192/87.11 |
| 2007/0082778 A1 | 4/2007 | Yamamura et al. | |
| 2008/0188342 A1 * | 8/2008 | Jackson | 475/218 |
| 2008/0234093 A1 | 9/2008 | Diosi et al. | |

* cited by examiner

GEAR ASSEMBLY FOR MOTOR VEHICLE

REFERENCE TO RELATED APPLICATIONS

This is a divisional of U.S. patent application Ser. No. 13/013,589 filed Jan. 25, 2011, which claims priority to and the benefit of U.S. Provisional Application Ser. No. 61/282,339 filed on Jan. 26, 2010, the entire contents of which are incorporated herein by reference.

BACKGROUND

The present application relates generally to the field of drive trains for motor vehicles. More specifically, the present application relates to a dual gear system which provides power in one of two gear ratios to the coupled driving wheels.

There is an ever increasing need for higher efficiency from powertrains of motor vehicles, due to increasing energy prices and increasing regulations, such as government Corporate Average Fuel Economy (CAFE) standards. It would be advantageous for a powertrain or gear system to provide higher efficiency over a broad range of speeds and torques. Thus it would be useful for the gear system of a motor vehicle to include more gears that are able to improve efficiency and to improve performance by providing higher torque across a wide range of speeds.

SUMMARY

According to an exemplary embodiment, a gear assembly for a motor vehicle includes an input shaft configured to rotate about an axis of rotation, wherein the input shaft includes a first end configured to receive input torque from a first vehicle component and a second end configured to transmit torque. An output shaft is configured to rotate about the axis of rotation, wherein the output shaft includes a first end configured to transmit output torque to a second vehicle component and a second end configured to receive torque. A planetary gear train is configured to provide output torque to the output shaft, wherein the planetary gear train includes a ring gear, a sun gear, a plurality of planet gears, and a carrier. A first clutch is configured to selectively couple the input shaft to the output shaft to transmit torque, and a second clutch configured to selectively couple the input shaft to the planetary gear train. When the first clutch is activated and the second clutch is not activated, the input torque is transmitted from the input shaft to the output shaft such that the output torque relative to the input torque is a first gear ratio. When the second clutch is activated and the first clutch is not activated, the input torque is transmitted from the input shaft to the output shaft through the planetary gear train such that the output torque relative to the input torque is a second gear ratio. When neither the first clutch nor the second clutch are activated, the input torque is not transmitted from the input shaft to the output shaft.

According to another exemplary embodiment, a gear assembly for a motor vehicle includes an input shaft including a first end configured to receive input torque from a first vehicle component and a second end configured to transmit torque and an output shaft including a first end configured to transmit output torque to a second vehicle component and a second end configured to receive torque. A planetary gear train includes a ring gear, a sun gear, a plurality of planet gears, and a carrier. A slide member is rotationally coupled to the input shaft to receive input torque. The slide member is configured to slide between a first position and a second position in a sliding direction relative to the second end of the input shaft. At the first position, the slide member engages the planetary gear train to transmit torque from the input shaft to the output shaft through the slide member and planetary gear train such that the output torque relative to the input torque is a first gear ratio. At the second position, the slide member engages the output shaft without engaging the planetary gear train to transmit torque from the input shaft to the output shaft through the slide member such that the output torque relative to the input torque is a second gear ratio. When the slide member is between the first and second positions, the slide member engages neither the planetary gear train nor the output shaft, and the input torque is not transmitted from the input shaft to the output shaft.

According to another exemplary embodiment, a gear assembly for a motor vehicle includes an input shaft configured to rotate about an axis of rotation and an output shaft configured to rotate about the axis of rotation. A planetary gear train is configured to receive torque from the input shaft, wherein the planetary gear train includes a ring gear connected to the input shaft, a sun gear, a plurality of planet gears, and a carrier configured to transmit output torque. A clutch is configured to selectively couple the output shaft and the planetary gear train. When the clutch is activated, the output shaft and the carrier rotate together about the axis of rotation, and the input torque is transmitted from the input shaft through the planetary gear train to the output shaft, so that the output torque relative to the input torque is a first gear ratio. When the clutch is not activated, the carrier is decoupled from the output shaft but the sun gear is coupled to the output shaft, and the input torque is transmitted from the input shaft to the output shaft through the planetary gear train, so that the output torque relative to the input torque is a second gear ratio.

DETAILED DESCRIPTION OF PREFERRED EMBODIMENTS

Figure 1:
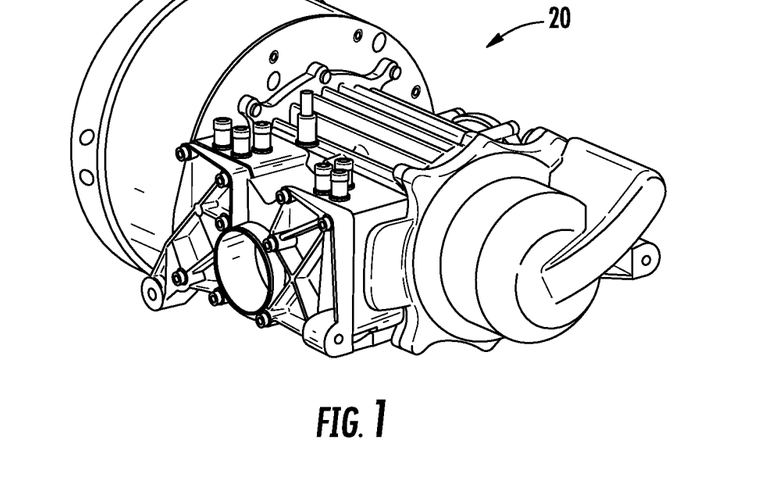
FIG. 1 is a perspective view of an exemplary embodiment of a dual gear assembly.

As shown in FIG. 1, a dual gear assembly 20 according to an exemplary embodiment is illustrated and may be used within a motor vehicle to provide two gear ratios. The dual gear assembly 20 may be coupled to the output of a conventional transmission having a specified number of gear ratios (e.g., six gear ratios) to provide the vehicle with twice the number of gear ratios provided by the conventional transmission. For example, a vehicle having a conventional transmission with six gear ratios coupled to a dual gear assembly would have a total of twelve gear ratios. This provides the vehicle with improved efficiency and with improved power over a broad range of speeds. Accordingly, any transmission having any number of specified gear ratios may be coupled to the dual gear assemblies as described herein to provide such improvements. Additionally, according to other exemplary embodiments, the dual gear assemblies as described herein may be coupled directly to the output from the engine, such as the driveshaft.

Figure 2:
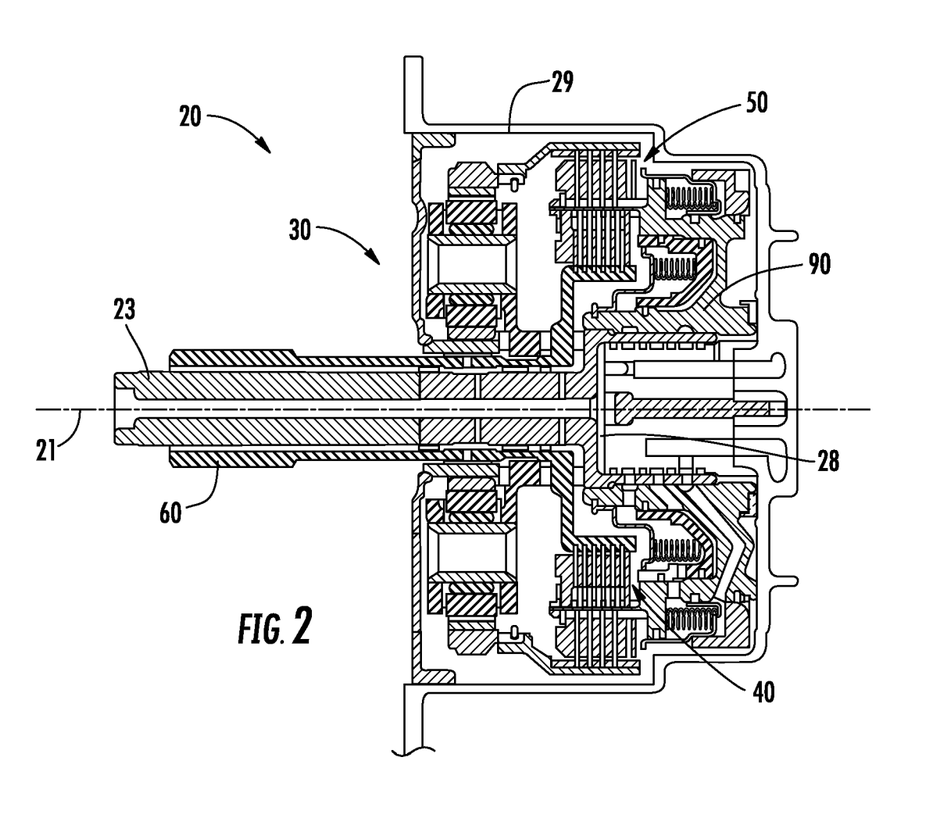
FIG. 2 is a cross-sectional view of the dual gear assembly of FIG. 1.
Figure 3:
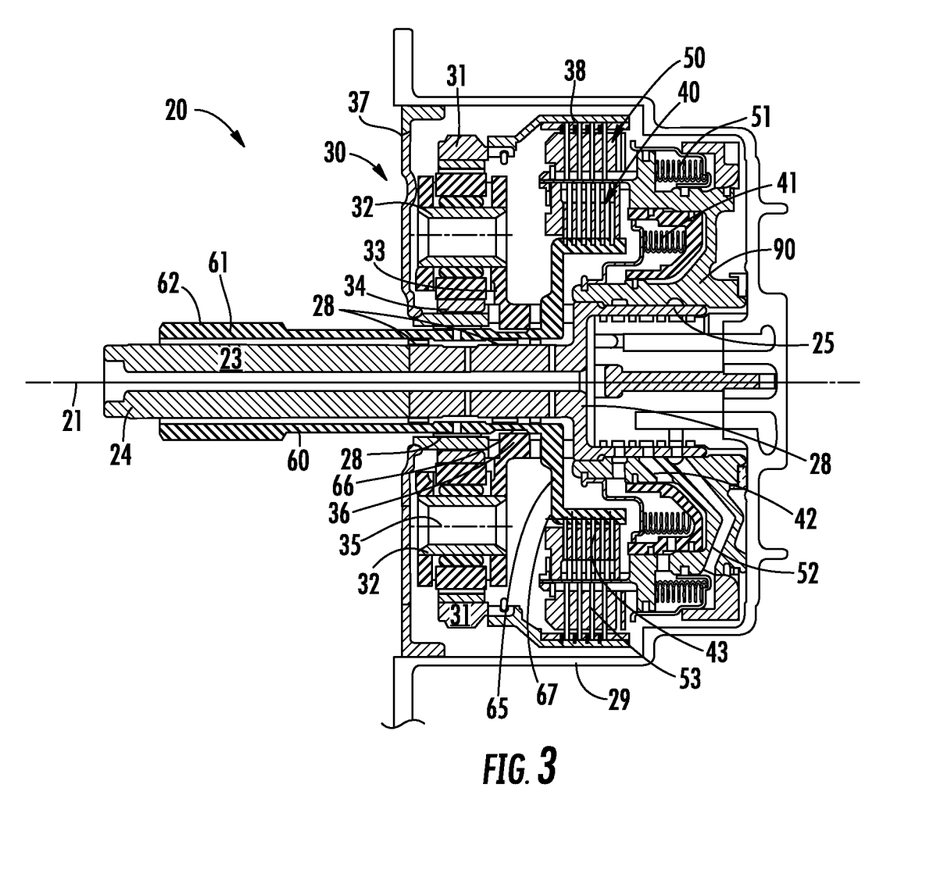
FIG. 3 is another cross-sectional view of the dual gear assembly of FIG. 1.

As shown in FIGS. 2 and 3, the dual gear assembly 20 includes an input shaft 23 that is configured to rotate about an axis of rotation 21, at least one bearing 28, a housing 29, a planetary gear train (PGT) 30, a first clutch 40, a second clutch 50, an output shaft 60, and a drive (or linking) member 90. According to an exemplary embodiment, the input shaft 23 may be made from steel or some other suitable material strong enough to transmit or communicate torque from the engine or transmission of a motor vehicle. The input shaft 23 may be configured as a tube or a shaft, and includes a first end 24 configured to engage the engine, the transmission, or a driveshaft transmitting torque from either the engine or transmission, and a second end 25. The inner surface of the second end 25 of the input shaft 23 may be rotationally coupled to the bearing 28, which may be rotationally coupled to the housing 29, so that the second end 25 may rotate about the axis of rotation 21 relative to the housing 29. The outer surface of the second end 25 of the input shaft 23 may be rotationally coupled to the inner surface of the drive member 90, so that rotation of the input shaft 23 about the axis of rotation 21 rotates the drive member 90 about the axis of rotation 21 with substantially the same frequency and torque. According to an exemplary embodiment, the second end 25 may include external splines that engage internal splines of drive member 90. According to another exemplary embodiment, the second end 25 may be welded, fastened, or any combination thereof to the drive member 90.

The drive member 90 may be coupled to the first clutch 40, so that actuation of the first clutch 40 may selectively couple the drive member 90 to or decouple the drive member 90 from the output shaft 60, thus causing the output shaft 60 to rotate with substantially the same frequency, torque, and power as the coupled input shaft 23 and drive member 90. The first clutch 40 may be actuated by a first clutch piston 41, which may be controlled by a first hydraulic assembly 42. Fluid pressure produced by the hydraulic assembly 42 displaces the first clutch piston 41 from a first non-coupled position to a second coupled position. In the first non-coupled position, the drive member 90 is decoupled (or disengaged) from the output shaft 60, such that no torque or rotation is transmitted or communicated to the output shaft 60. In the second coupled position, the drive member 90 is coupled (or engaged) to the output shaft 60 through an engaging feature 43. Thus, the engaging feature 43 couples the drive member 90 to the output shaft 60 so that rotation of the drive member 90 about the axis of rotation 21 rotates the output shaft 60 about the axis of rotation 21 with substantially the same frequency and torque.

According to an exemplary embodiment, the output shaft 60 may rotate about the axis of rotation 21 and may be made of steel or some other useful material strong enough to transmit or communicate torque from another component or member of gear system 20. The output shaft 60 includes a first end 61 and a second end 65, and may be configured as a tube having an inner diameter coupled to the outer diameter of at least one bearing 28, which may then have an inner diameter coupled to the outer diameter of input shaft 23. Thus, the output shaft 60 and input shaft 23 are substantially concentric and configured to rotate substantially about the axis of rotation 21. The output shaft 60 may rotate with the same torque, frequency, and power relative to the input shaft 23 or may rotate with a different torque, frequency, and power relative to the input shaft 23, depending on the mode of operation of the dual gear assembly 20. The outer diameter of the output shaft 60 may be coupled to the inner diameter of at least one bearing 28, which may have an outer diameter coupled to a member of the PGT 30, to the housing 29, to another vehicle component, or any combination thereof. The first end 61 of the output shaft 60 includes a coupling feature 62 configured to transmit or communicate torque to another member, such as a pinion shaft, rear differential, or rear axle. According to an exemplary embodiment, the coupling feature 62 includes splines that engage a mating member. However, the coupling feature 62 may utilize any method of communicating torque to another rotating member may be used.

The second end 65 of the output shaft 60 is configured to have a gear reduced coupling 66 and a direct coupling 67. According to an exemplary embodiment, the second end 65 of the output shaft 60 is configured to have more than one outer diameter (i.e., a stepped or shouldered end), where the gear reduced coupling 66 is located on one step and includes external splines or gear teeth to engage a member of the PGT 30, and where the direct coupling 67 is located on a second step and includes splines or gear teeth to engage the engaging feature 43 of the first clutch 40.

The PGT 30 includes a ring gear 31, a plurality of planet gears 32, a carrier 33, and a sun gear 34. According to an exemplary embodiment, the sun gear 34 is held stationary or fixed, while the ring gear 31 provides input power or torque to the PGT 30 through the second clutch 50 from the drive member 90, and the carrier 33 provides gear-reduced output power or torque to the output shaft 60. According to an exemplary embodiment, the ring gear 31 may rotate substantially about the axis of rotation 21 and includes internal gear teeth that engage the plurality of planet gears 32, and a coupling member 38, which includes internal splines or gear teeth that may be selectively coupled to the second clutch 50. According to an exemplary embodiment, each planet gear 32 includes external gear teeth, which engage the internal gear teeth of the ring gear 31 and the external gear teeth of the sun gear 34 simultaneously, and a pivot axis or an axis of rotation 35, where each pivot axis 35 may be coupled to the carrier 33. Thus, each planet gear 32 rotates about its pivot axis 35 relative to the carrier 33, and the plurality of planet gears 32 rotate together with the carrier 33 about the axis of rotation 21 relative to the sun gear 34.

According to an exemplary embodiment, the carrier 33 includes a plurality of apertures for coupling the plurality of planet gears 32, where each aperture is substantially concentric to the pivot axis 35 of one of the plurality of planet gears 32. The carrier 33 further includes a gear-reduced coupling 36 having an inner diameter that forms an aperture substantially concentric to the axis of rotation 21 and having internal gear teeth coupled to the external gear teeth of the gear-reduced coupling 66 of the output shaft 60. Thus, the carrier 33 and output shaft 60 rotate about the axis of rotation 21 with substantially the same torque, frequency, and power. According to an exemplary embodiment, the sun gear 34 includes external gear teeth, which engage the external gear teeth of the planet gears 32, and a fixing member 37 coupled to the housing 29 of the dual gear assembly 20, which prohibits rotation of the sun gear 34 relative to the housing 29.

According to this embodiment, the sun gear 34 rotates with an angular velocity of $\omega_s$ (where $\omega_s$ is zero, for the configuration shown in FIGS. 2 and 3, being fixed to housing 29) having the number of gear teeth $N_s$, the ring gear 31 rotates with an angular velocity of $\omega_r$ having the number of gear teeth $N_r$, and the carrier 33 rotates with an angular velocity of $\omega_c$ having the number of gear teeth $N_c$. The gear ratio ($i_{rc}$) for this configuration may be calculated as follows:

$$i_{rc} = \frac{\omega_r}{\omega_c} = 1 + \frac{N_s}{N_r} \geq 1$$

According to another embodiment, the PGT may include the ring gear held stationary or fixed, the sun gear providing input power or torque to PGT through a second clutch from a drive member, and the carrier providing output power or torque to an output shaft. According to another embodiment, the PGT may include a carrier held stationary or fixed, the sun gear providing input power or torque to PGT through a second clutch from a drive member, and the ring gear providing output power or torque to an output shaft.

The drive member 90 may be coupled to the second clutch 50, so that actuation of the second clutch 50 may selectively couple the drive member 90 to the coupling member 38 of the ring gear 31 of the PGT 30, inducing the ring gear 31 to rotate with the same frequency, torque, and power as the coupled input shaft 23 and drive member 90. The second clutch 50 may be actuated by a second clutch piston 51, which may be controlled by a second hydraulic assembly 52. Fluid pressure produced by the hydraulic assembly 52 displaces the second clutch piston 51 from a first non-coupled position to a second coupled position. In the first non-coupled position, the drive member 90 is decoupled (or disengaged) form the coupling member 38 of the ring gear 31 of the PGT 30, such that no torque or power is transmitted or communicated. In the second coupled position, the drive member 90 is selectively coupled (or engaged) to the ring gear 31 of the PGT 30 through the engaging feature 53 of the second clutch 50, which selectively engages coupling member 38, so that rotation of the drive member 90 about the axis of rotation 21 rotates the ring gear 31 about the axis of rotation 21 with substantially the same frequency, torque, and power.

According to an exemplary embodiment, the dual gear assembly 20 has three operating configurations. The first configuration is a neutral configuration, where the drive member 90 is coupled internally to the input shaft 23 and receives torque, but neither the first clutch 40 nor the second clutch 50 is engaged, so the drive member 90 is not coupled externally and does not communicate torque or power to the output shaft 60. The second configuration is a direct connection configuration, where the first clutch 40 is engaged, but the second clutch 50 is not engaged, so the drive member 90 is coupled externally to the direct coupling 67 of the second end 65 of the output shaft 60 and coupled internally to the input shaft 23. Thus, the second (or direct connection) configuration of the dual gear assembly 20 outputs substantially the same torque and power relative to the torque and power that are input into the assembly. The third configuration is a gear-reduction configuration, where the second clutch 50 is engaged, but the first clutch 40 is not engaged, so the drive member 90 is coupled externally to the coupling member 38 of the ring gear 31 of the PGT 30, and coupled internally to the input shaft 23. Thus, the third (or gear-reduced) configuration of the dual gear assembly 20 outputs torque and power that are gear-reduced by the PGT 30 relative to the torque and power that are input into the assembly.

Figure 4:
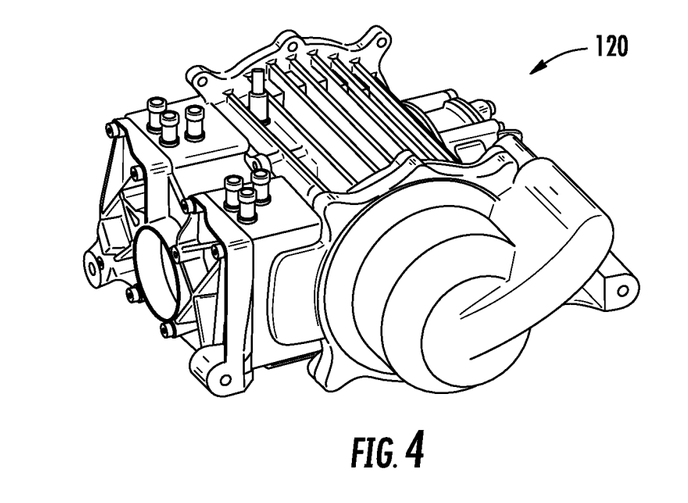
FIG. 4 is a perspective view of another exemplary embodiment of a dual gear assembly.

As shown in FIG. 4, a dual gear assembly 120 according to another exemplary embodiment is illustrated and may be used within a motor vehicle to provide two gear ratios. The dual gear assembly 120 may be coupled to the output of a conventional transmission having a specified number of gear ratios, so that the vehicle having this configuration would have as the total number of gear ratios, twice the number of gear ratios of the conventional transmission.

Figure 5:
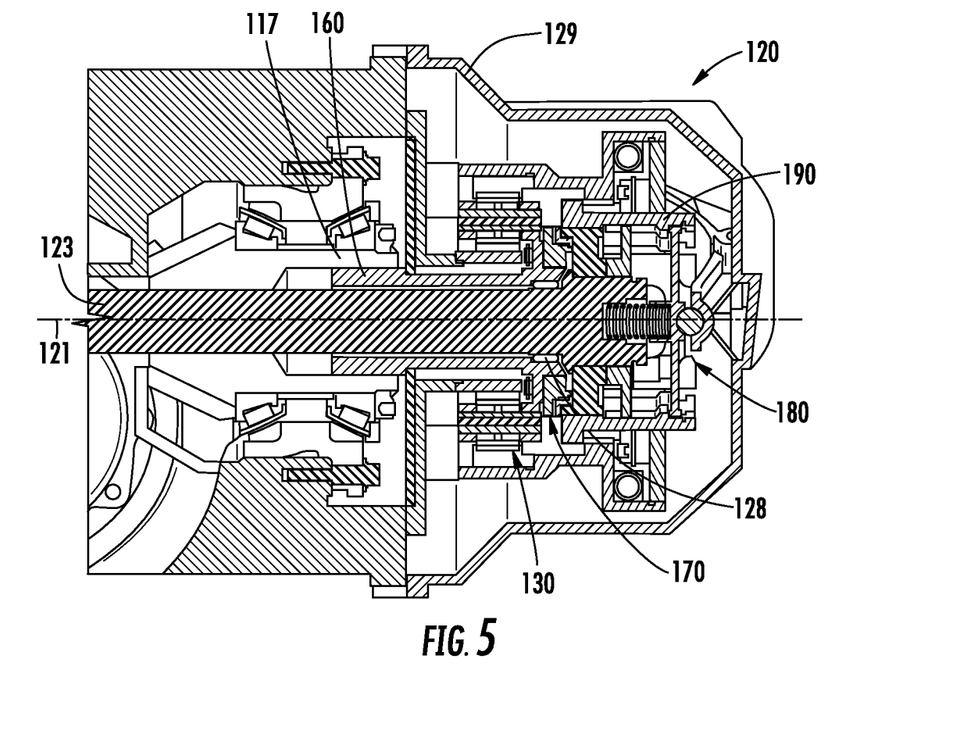
FIG. 5 is a cross-sectional view of the dual gear assembly of FIG. 4.
Figure 6:
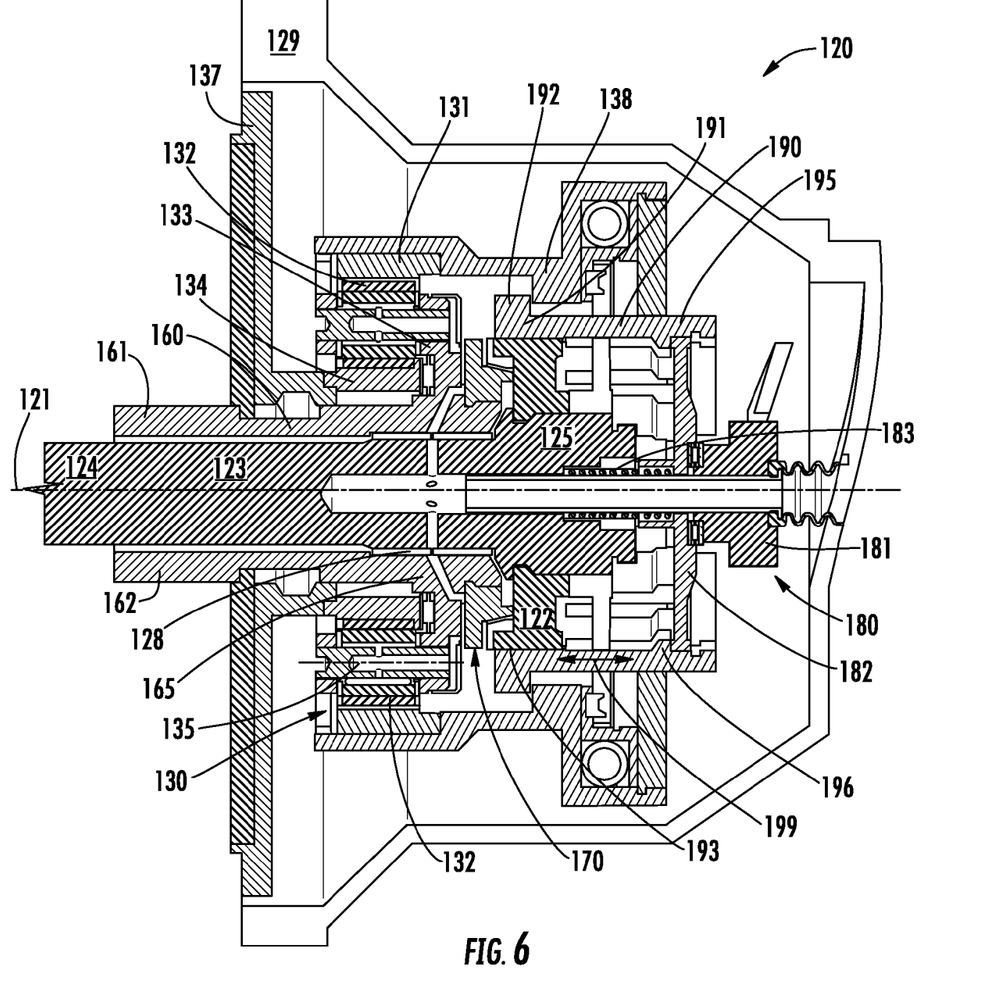
FIG. 6 is another cross-sectional view of the dual gear assembly of FIG. 4, shown in its neutral position.

As shown in FIGS. 5 and 6, the dual gear assembly 120 includes an input shaft 123 that is configured to rotate about an axis of rotation 121, at least one bearing 128, a housing 129, a planetary gear train (PGT) 130, an output shaft 160, a synchronizer assembly 170, an actuator assembly 180, and a slide or slide member 190. According to an exemplary embodiment, the input shaft 123 may be made from steel or some other suitable material strong enough to transmit or communicate torque and power from the engine or transmission of a motor vehicle. The input shaft 123 may be configured as a tube or a shaft, and may have a first end 124 configured to engage the engine, the transmission, or a driveshaft transmitting torque from either the engine or transmission and a second end 125. The second end 125 of the input shaft 123 may include external splines configured to couple to internal splines of the slide member 190, so that the slide member 190 is rotationally coupled to the input shaft 123, but may slide axially along the axis of rotation relative to the input shaft 123. Thus, slide member 190 rotates with substantially the same torque and frequency as the input shaft 123.

The output shaft 160 may rotate about axis of rotation 121 and may be made of steel or some other suitable material strong enough to transmit or communicate torque from another component or member of the dual gear system 120. According to an exemplary embodiment, the output shaft 160 includes a first end 161 and a second end 165, and may be configured as a tube having an inner diameter coupled to the outer diameter of at least one bearing 128, which has an inner diameter coupled to the outer diameter of the input shaft 123. Thus, the output shaft 160 and input shaft 123 are substantially concentric and both rotate substantially about the axis of rotation 121. The output shaft 160 may rotate about the bearing(s) 128 with a different torque, frequency, and power relative to the input shaft 123, or the output shaft 160 may rotate about bearing(s) 128 with the same torque, frequency, and power relative to the input shaft 123, depending on the operating configuration of the dual gear system 120. The first end 161 of the output shaft 160 includes a coupling feature 162 having splines configured to transmit or communicate torque to another member, such as a pinion shaft 117 (shown in FIG. 5), rear differential, or rear axle. According to an exemplary embodiment, the second end 165 of the output shaft 160 is configured to couple to the carrier 133 of the PGT 130, so that the output shaft 160 and carrier 133 rotate with substantially the same torque, frequency, and power about the axis of rotation 121. The second end 165 and the carrier 133 may be coupled by any useful method, such as splines, which can transmit or communicate torque. According to another exemplary embodiment, the output shaft 160 and the carrier 133 of the PGT 130 are configured to be one-piece (i.e., manufactured to be the same component) and thus rotate as one, having the same torque, frequency, and power. This embodiment of the output shaft 160 may be configured so that the carrier 133 extends from its second end 165, where the output shaft 160 forms an integral part of the PGT 130.

The PGT 130 includes a ring gear 131, a plurality of planet gears 132, a carrier 133, and a sun gear 134. According to an exemplary embodiment, the sun gear 134 is held stationary or fixed, while the ring gear 131 provides input power or torque to the PGT 130 through engagement of the slide member 190, and the carrier 133 provides gear-reduced output power or torque to the output shaft 160. According to an exemplary embodiment, the ring gear 131 may rotate substantially about the axis of rotation 121 and includes internal gear teeth, which engage the plurality of planet gears 132, and a coupling member 138, which has an inner diameter that includes splines or gear teeth that may selectively couple to the slide member 190. According to an exemplary embodiment, each planet gear 132 includes external gear teeth, which engage the internal gear teeth of the ring gear 131 and the external gear teeth of the sun gear 134 simultaneously. Accordingly, each planet gear 132 rotates about an independent pivot axis or its own axis of rotation 135. Additionally, each planet gear 132 may include an inner diameter, which may be coupled to the carrier 133. Thus, each planet gear 132 rotates about its pivot axis 135 relative to the carrier 133, and the plurality of planet gears 132 rotate together with the carrier 133 about the axis of rotation 121 relative to the sun gear 134. According to an exemplary embodiment, the carrier 133 includes a plurality of apertures for coupling the plurality of planet gears 132, where each aperture is substantially concentric to the pivot axis 135 of one of the plurality of planet gears 132. According to an exemplary embodiment, the sun gear 134 includes external gear teeth, which engage the external gear teeth of the plurality of planet gears 132, and a fixing member 137 coupled to the housing 129 of the dual gear assembly 120, which prohibits rotation of the sun gear 134 relative to the housing 129.

The slide member 190 includes a first end 191 and a second end 195, and is configured to move between a first position and a second position along sliding direction 199 when driven by an actuator 182 of the actuator assembly 180. The first end 191 of the slide member 190 may include an outer engaging feature 192 for selectively engaging to the coupling member 138 of the ring gear 131, and an inner engaging feature 193 for coupling to the external splines of the intermediate member 122 and for selectively engaging the synchronizer 170. According to an exemplary embodiment, the intermediate member 122 may be formed separate to the input shaft 123 and may include internal splines for coupling and transmitting torque to the second end 125 of the input shaft 123. According to another exemplary embodiment, the intermediate member 122 may be integrally formed with the second end 125 of the input shaft 123 to include external splines that may be rotationally coupled to the internal splines to the inner engaging feature 193 of the slide member 190, so that torque and power are transmitted or communicated from the input shaft 123 to the slide member 190 through the intermediate member 122. According to an exemplary embodiment, the outer engaging feature 192 may include external splines for selectively engaging the internal splines of the coupling member 138, and the inner engaging feature 193 may include internal splines for engaging the external splines of the second end 125 of the input shaft 123 and for selectively engaging the external splines of the synchronizer 170.

The second end 195 of the slide member 190 may include a coupling feature 196, which couples to the actuator 182. According to an exemplary embodiment, coupling feature 196 may be an axial couple, such as a detent or other shape, to allow rotation of the slide member 190 about the axis of rotation 121 relative to the actuator 182, but where displacement of the actuator 182 along the sliding direction 199 displaces the slide member 190 with substantially the same displacement as the actuator 182. According to another exemplary embodiment, the coupling feature 196 may be a rigid couple, where rotation of the slide member 190 about the axis of rotation 121 induces substantially the same rotation into the actuator 182, and where displacement of the actuator 182 along the sliding direction 199 displaces the slide member 190 with substantially the same displacement as the actuator 182.

Displacement of the slide member 190 and actuator 182 may be induced by the actuator assembly 180, which includes a piston 181 and an actuator 182. According to an exemplary embodiment, the piston 181 may be configured to produce a force generated by varying its pneumatic pressure to displace the actuator 182 along the axis of rotation 121. According to another exemplary embodiment, the piston 181 may be configured to produce a force generated by varying its hydraulic pressure to displace the actuator 182. Thus, fluid pressure in the chamber housing the piston 181 may be increased to produce a force that displaces the piston 181 along a line that may be substantially parallel to the axis of rotation 121, where the actuator 182 may be displaced by the piston 181 from a first position to a second position, or to a neutral position (i.e., position between first and second positions). This displacement of the actuator 182 induces displacement of the slide member 190 from a first position to a second position, or to a neutral position. When the slide member 190 is in its first position, the inner engaging feature 193 is coupled to the input shaft 123 and the outer engaging feature 192 is coupled to the coupling member 138 of the ring gear 131. Thus, torque transmits or communicates from the input shaft 123 into the ring gear 131 of the PGT 130 through the slide member 190, so the output torque and power of the output shaft 160 are gear-reduced through the PGT 130. When the slide member 190 is in its second position, the inner engaging feature 193 is coupled to the input shaft 123 and is further coupled to the output shaft 160 through the synchronizer 170, while the outer engaging feature 192 is decoupled. Thus, torque transmits or communicates from the input shaft 123 to the output shaft 160 through the slide member 190 and the synchronizer 170, so that output torque and power are not gear-reduced. When the slide member 190 is in its neutral position, the inner engaging feature 193 is coupled only to the input shaft 123 and the outer engaging feature 192 is decoupled. Thus, no torque or power are transmitted or communicated to the output shaft 160.

The actuator assembly 180 may further include a biasing member 183, such as a coil spring, that may produce a force in the direction substantially opposite to the force generated by the piston 181. When the pressure in the piston 181 is reduced to a predetermined amount that produces a force having a lower magnitude relative to the force produced by the biasing member 183, then the actuator 182 may be displaced from its second position to its first position. According to another embodiment, the piston 181 may displace the actuator 182 and/or slide member 190 from its second position (i.e., where torque is not gear-reduced) to its first position (i.e., where torque is gear-reduced through the PGT 130) and where the biasing member 183 is configured to displace the actuator 182 and/or slide member 190 from its first position to its second position.

The dual gear assembly 120 may have three operating configurations. The first configuration is a neutral configuration, where the input shaft 123 is decoupled from the output shaft 160. The second configuration is a direct connection configuration, where the input shaft 123 is coupled directly to the output shaft 160 through synchronizer 170 by the slide member 190. Thus, the second configuration of the dual gear assembly 120 outputs substantially the same torque and power relative to the torque and power that is input into the assembly. The third configuration is a gear-reduction configuration, where the input shaft 123 is coupled to the output shaft 160 through the PGT 130 by the slide member 190. Thus, the third configuration of the dual gear assembly 120 outputs torque and power that are gear-reduced by the PGT 130 relative to the torque and power that are input into the assembly.

Figure 7:
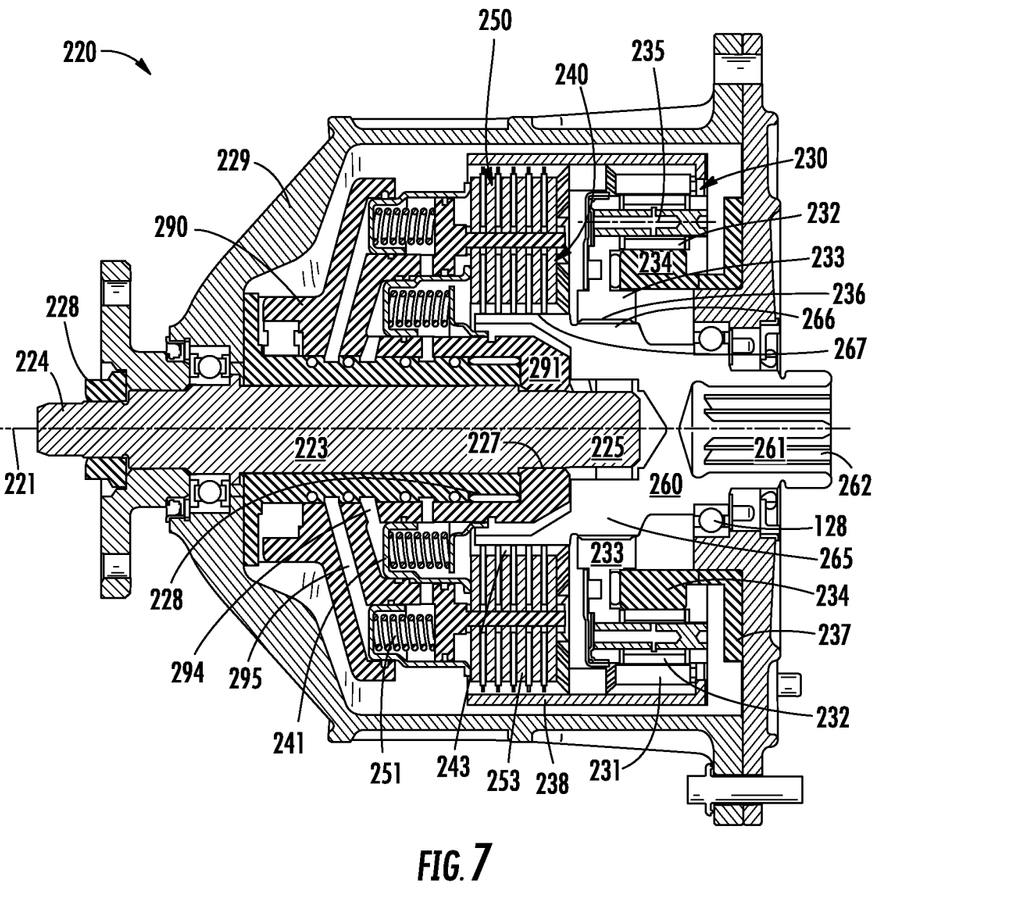
FIG. 7 is a cross-sectional view of another exemplary embodiment of a dual gear assembly.

As shown in FIG. 7, the dual gear assembly 220 according to another exemplary embodiment is illustrated and includes an input shaft 223 that is configured to rotate about an axis of rotation 221, at least one bearing 228, a housing 229, a planetary gear train (PGT) 230, a first clutch 240, a second clutch 250, an output shaft 260, and a linking member 290. According to an exemplary embodiment, the input shaft 223 may be made from steel or some other suitable material strong enough to transmit or communicate torque from the engine or transmission of a motor vehicle. The input shaft 223 may be configured as a tube or a shaft, and may have a first end 224 configured to engage a member providing input torque and power. The input shaft 223 may further include a second end 225, having external splines 227, which engage internal splines 291 of the linking member 290. Thus, the input shaft 223 is coupled to linking member 290, so that both the input shaft 223 and linking member 290 rotate about the axis of rotation 221 with substantially the same torque, frequency, and power. According to an exemplary embodiment, the linking member 290 further includes a first hydraulic cavity or line 294 and a second hydraulic cavity or line 295, which may be used to bring hydraulic fluid to the first and second pistons 241, 251 of the first and second clutches 240, 250, respectively.

According to an exemplary embodiment, the first clutch 240 and second clutch 250 may be coupled to the linking member 290 to rotate about the axis of rotation 221 with substantially the same torque and frequency as the linking member 290. Actuation of the first clutch 240 may selectively couple the linking member 290 directly to the output shaft 260, inducing the output shaft 260 to rotate with substantially the same torque, frequency, and power of the input shaft 223. Actuation of the second clutch 250 may selectively couple the linking member 290 to the output shaft 260 through the PGT 230, inducing the output shaft 260 to rotate with a torque and power that are gear-reduced through the PGT 230 relative to the torque and power of the input shaft 223.

The first clutch 240 includes an engaging feature 243, which may be selectively engaged to (or brought into contact with) the output shaft 260 through friction, and a first piston 241 configured to produce a force that induces the friction between the engaging feature 243 and the output shaft 260. The engaging feature 243 may be displaced by the force of the piston 241 into contact with the output shaft 260 to induce friction between the engaging feature 243 of the first clutch 240 and the output shaft 260, thereby resulting in the coupling of the linking member 290 to the output shaft 260 through the first clutch 240. When the force from the piston 241 is removed, the engaging features 243 of the first clutch 240 may be disengaged from (or brought out of contact with) the output shaft 260, thereby removing the friction between the engaging feature 243 and the output shaft 260 and decoupling the linking member 290 from the output shaft 260. According to an exemplary embodiment, first clutch 240 may be configured so that the force exerted by the first piston 241 may be controlled by varying the hydraulic pressure or hydraulic fluid in first hydraulic line 294 from a first hydraulic pump or assembly (not shown). The force from the first piston 241 may displace the engaging feature 243, so that the engaging feature 243 is selectively coupled to the direct coupling 267 of the output shaft 260. Thus, the first piston 241 of the first clutch 240 may be actuated to couple the linking member 290 to the output shaft 260 through the first clutch 240, so that the input shaft 223 and the output shaft 260 rotate with substantially the same torque, frequency, and power.

The second clutch 250 includes an engaging feature 253, which may be selectively engaged to (or brought into contact with) the coupling member 238 of the ring gear 231 of the PGT 230 through friction, and a second piston 251 configured to produce a force that induces the friction between the engaging feature 253 and the coupling member 238. The engaging feature 253 may be displaced by the force of the piston 251 into contact with the coupling member 238 to induce friction between the engaging feature 253 of the second clutch 250 and the coupling member 238 of the PGT 230, thereby resulting in the coupling of the linking member 290 to the PGT 230 (and to the output shaft 260 that is also connected to the PGT 230) through the second clutch 250. When the force from the piston 251 is removed, the engaging feature 253 of the second clutch 250 may be disengaged from (or brought out of contact with) the coupling member 238, thereby removing the friction between the engaging feature 253 and the coupling member 238 and decoupling the linking member 290 from the PGT 230. According to an exemplary embodiment, the second clutch 250 may be configured so that the force exerted by the second piston 251 may be controlled by varying the hydraulic pressure or hydraulic fluid in the second hydraulic line 295 from a second hydraulic pump or assembly (not shown). The force from the second piston 251 may displace the engaging feature 253, so that the engaging feature 243 is selectively coupled to the coupling member 238 of the ring gear 231. Thus, the second piston 251 of the second clutch 250 may be actuated to couple the linking member 290 to the ring gear 231 of the PGT 230 through the second clutch 250, so that the output torque and power of the output shaft 260 are gear-reduced through the PGT 30 relative to the input torque and power of the input shaft 223.

According to an exemplary embodiment, the output shaft 260 may rotate about the axis of rotation 221 and may be made of steel or some other suitable material strong enough to transmit or communicate torque and power from another component or member of dual gear system 220. The output shaft 260 includes a first end 261 having a torque transmission feature 262 to allow for coupling to another vehicle component, such as the rear axle, to transmit or communicate torque and power. According to an exemplary embodiment, the torque transmission feature 262 may be a countersink having internal splines to engage external splines of a shaft of a mating vehicle component. According to another exemplary embodiment, the torque transmission feature 262 may be a shaft having external splines to engage the internal splines of a mating vehicle component. The output shaft 260 further includes a second end 265 having a direct coupling 267 and a gear reduced coupling 266. According to an exemplary embodiment, the direct coupling 267 includes external splines or gear teeth, which may be engaged by the internal splines of the engaging feature 243. According to an exemplary embodiment, the gear reduced coupling 266 includes external splines or gear teeth, which are coupled to the internal splines or gear teeth of the gear-reduced coupling 236 of the carrier 233.

The PGT 230 includes a ring gear 231, a plurality of planet gears 232, a carrier 233, and a sun gear 234. According to an exemplary embodiment, the sun gear 234 is held stationary or fixed, while the ring gear 231 provides input power or torque to the PGT 230 through the second clutch 250 from the linking member 290, and the carrier 233 provides gear-reduced output power or torque to the output shaft 260. According to an exemplary embodiment, the ring gear 231 may rotate substantially about the axis of rotation 221 and includes internal gear teeth that engage the plurality of planet gears 232, and a coupling member 238, which has an inner diameter that includes splines or gear teeth that may be selectively coupled to the second clutch 250. According to an exemplary embodiment, each planet gear 232 includes external gear teeth, which engage the internal gear teeth of the ring gear 231 and the external gear teeth of the sun gear 234 simultaneously. Accordingly, each planet gear 232 rotates about an independent pivot axis or its own axis of rotation 235. Additionally, each planet gear 232 may include an inner diameter, which may be coupled to the carrier 233. Thus, each planet gear 232 rotates about its pivot axis 235 relative to the carrier 233, and the plurality of planet gears 232 rotate together with the carrier 233 about the axis of rotation 221 relative to the sun gear 234.

According to an exemplary embodiment, the carrier 233 includes a plurality of apertures for coupling the plurality of planet gears 232, where each aperture is substantially concentric to the pivot axis 235 of one of the plurality of planet gears 232. The carrier 233 further includes a gear-reduced coupling 236 having an inner diameter that forms an aperture substantially concentric to the axis of rotation 221 and having internal gear teeth coupled to the external gear teeth of the gear-reduced coupling 266 of the output shaft 260. Thus, the carrier 233 and output shaft 260 rotate about the axis of rotation 221 with substantially the same torque, frequency, and power. According to an exemplary embodiment, the sun gear 234 includes external gear teeth that engage the external gear teeth of the plurality of planet gears 232, and a fixing member 237 coupled to the housing 229 of the dual gear assembly 220, which prohibits rotation of the sun gear 234 relative to the housing 229.

The dual gear assembly 220 may have three operating configurations. The first configuration is a neutral configuration, where neither the first clutch 240 nor the second clutch 250 is engaged, so the output shaft 260 remains uncoupled and receives no torque or power. The second configuration is a direct connection configuration, where the first clutch 240 is engaged, but the second clutch 250 is not engaged, so that the linking member 290 is coupled to both the direct coupling 267 of the second end 265 of the output shaft 260 and to the second end 225 of the input shaft 223. Thus, the second configuration of dual gear assembly 220 outputs substantially the same torque and power relative to the torque and power that are input into the assembly. The third configuration is a gear-reduction configuration, where the second clutch 250 is engaged, but the first clutch 240 is not engaged, so that the linking member 290 is coupled to both the coupling member 238 of the ring gear 231 of the PGT 230 and to the second end 225 of the input shaft 223. Thus, the third configuration of the dual gear assembly 220 outputs torque and power that are gear-reduced by the PGT 230 relative to the torque and power that are input into the assembly.

Figure 8:
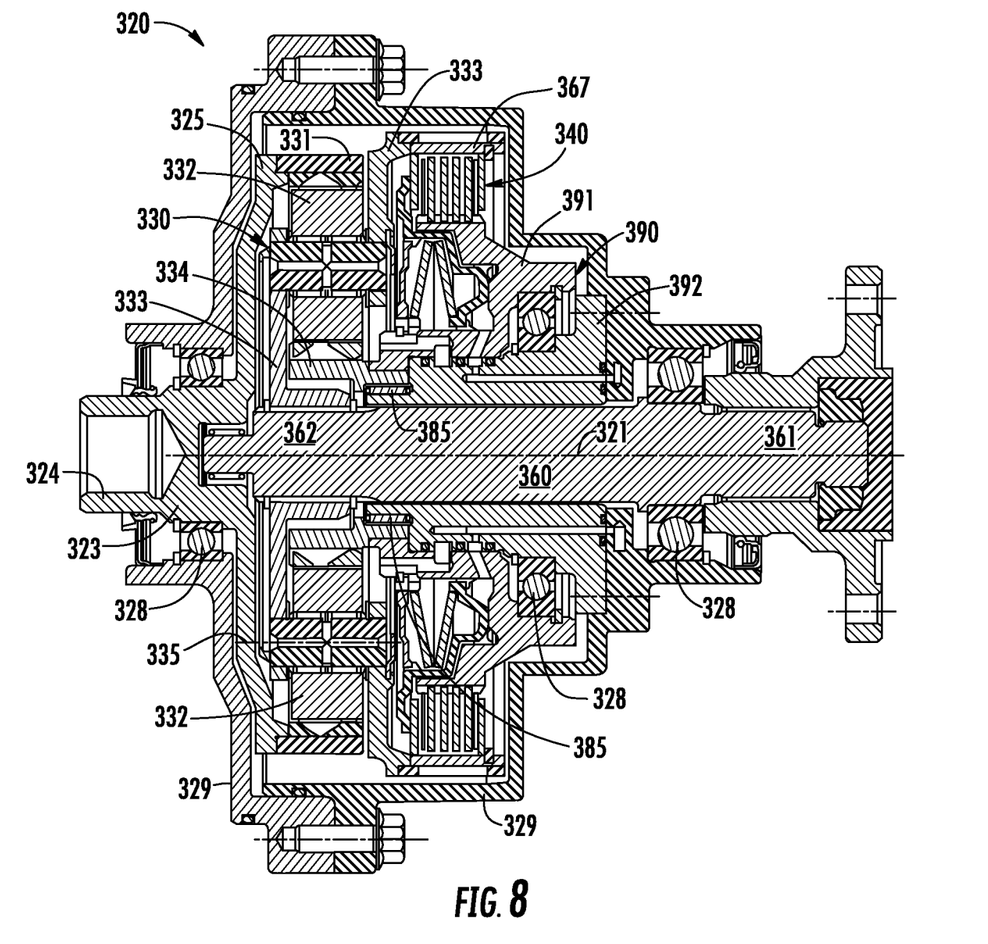
FIG. 8 is a cross-sectional view of yet another exemplary embodiment of a dual gear assembly.

As shown in FIG. 8, another exemplary embodiment of a dual gear assembly 320 is illustrated. The dual gear assembly 320 includes a an input shaft 323 that is configured to rotate about an axis of rotation 321, at least one bearing 328, a housing 329, a planetary gear train (PGT) 330, a clutch 340, an output shaft 360 configured to rotate about the axis of rotation 321, and a linking member 390. According to an exemplary embodiment, the linking member 390 includes an upper portion 391 and a lower portion 392. The upper and lower portions 391, 392 of the linking member 390 may be formed separately then rotationally coupled together, such as to include a bearing 328. According to an exemplary embodiment, the input shaft 323 may be made from steel or some other suitable material strong enough to transmit or communicate torque from the engine or transmission of a motor vehicle. The input shaft 323 may have an annular shaped first end 324 configured to receive a member that provides the input torque and power. The input shaft 323 may further include an annular shaped second end 325 configured having a different diameter. According to an exemplary embodiment, the second end 325 is connected to the PGT 330. According to an exemplary embodiment, the output shaft 360 may be made of steel or some other suitable material strong enough to transmit or communicate torque and power, such as from the dual gear assembly 320 to another vehicle component or assembly. The output shaft 360 includes a first end 361 having a torque transmission coupling to allow for coupling to another vehicle component, such as the rear axle, to transmit or communicate torque and power. The output shaft 360 also includes a second end 362 having a coupling to receive torque, such as from the PGT 330. The coupling on the second end 362 may be configured as external splines configured along the outside diameter of the output shaft 360.

The PGT 330 includes a ring gear 331, a plurality of planet gears 332, a carrier 333, and a sun gear 334. According to an exemplary embodiment, the ring gear 331 is connected to the second end 325 of the input shaft 323, so that the ring gear 331 provides the input power and torque to the PGT 330. The ring gear 331 may be formed separately from the input shaft 323 then coupled to the shaft, such as through welding, or the ring gear 331 and the input shaft 323 may be integrally formed. Thus, the ring gear 331 is configured to rotate about the axis of rotation 321. According to an exemplary embodiment, the ring gear 331 rotates substantially about the axis of rotation 221 and includes internal gear teeth that engage the plurality of planet gears 332. According to an exemplary embodiment, each planet gear 332 includes external gear teeth, which engage the internal gear teeth of the ring gear 331 and the external gear teeth of the sun gear 334 simultaneously. Accordingly, each planet gear 332 rotates about an independent pivot axis or its own axis of rotation 335. Additionally, each planet gear 232 may include an inner diameter that is substantially concentric with its own axis of rotation 335, which may be coupled to the carrier 333. Thus, each planet gear 332 may rotate about its pivot axis 335 relative to the carrier 333, and the plurality of planet gears 332 may rotate together with the carrier 333 about the axis of rotation 321, such as relative to the sun gear 334.

According to an exemplary embodiment, the carrier 333 includes a plurality of apertures. Each aperture is configured substantially concentric to the pivot axis 335 of one of the plurality of planet gears 332, and is configured to couple one planet gear from the plurality of planet gears 332. The carrier 333 of the PGT 330 may be rotationally coupled to the output shaft 360, so that the output shaft 360 rotates about the axis of rotation 321 with the same frequency, torque and power as the carrier 333. For example, the carrier 333 may include an opening having internal splines configured to engage external splines on the second end 362 of the output shaft 360. The carrier 333 may also be configured to selectively couple to the linking member 390 through the clutch 340. According to an exemplary embodiment, the carrier 333 includes a direct coupling 367 that is brought into contact with one plate (or a plurality of plates) of the clutch 340 to induce coupling between the carrier 33 and the clutch 340 through friction. The clutch 340 may include a piston that controls the plate and hence the amount of friction between the clutch 340 and the carrier 333, thereby controlling whether the clutch 340 and carrier 333 are coupled or decoupled.

According to an exemplary embodiment, the sun gear 334 includes external gear teeth that engage the external gear teeth of the plurality of planet gears 332. The sun gear 334 may be selectively rotationally coupled to the linking member 390 through a coupling 385, such as a free-wheel coupling, which may be configured to allow the sun gear 334 to rotate about the axis of rotation 321 in one direction only. For example, the free-wheel coupling 385 may have a first closed position that prohibits free rotation of the sun gear 334 about the axis of rotation 321, and a second free or open position that allows the sun gear 334 to rotate about the axis of rotation 321.

According to an exemplary embodiment, the clutch 340 is configured to selectively couple the linking member 390 to the carrier 333 of the PGT 330, so that the linking member 390 may rotate about the axis of rotation 221 with substantially the same torque and frequency as the carrier 333. The clutch 340 may include a first open position and a second closed position. According to an exemplary embodiment, the clutch 340 includes a piston that when activated induces the clutch 340 into the open position, and when the piston is deactivated induces the clutch 340 into the closed position.

The dual gear assembly 320 may have three operating configurations. The first configuration is a low gear configuration, where the clutch 340 is configured in the open position and the free-wheel coupling 385 is configured in the closed position. In the low gear, the sun gear 334 is prohibited from rotating about the axis of rotation 321, so torque enters the PGT 330 from the input shaft 323 and is transferred in a gear-reduced (or gear increased) fashion through the plurality of planet gears 332 and into the carrier 333, which rotates about the axis of rotation 321 in the same rotational direction as the ring gear 331 (and input shaft 323), but rotates with a gear-reduced torque. The carrier 333 transfers the gear-reduced torque to the second end 362 of the output shaft 360, which may then communicate the torque out the first end 361. The second configuration is a high gear configuration, where the clutch 340 is configured in the closed position and the free-wheel coupling 385 is configured in the free or open position to allow the sun gear 334 to rotate about the axis of rotation 321. In the high gear, the ring gear 331 (and input shaft 323), the carrier 333, and the plurality of planet gears 332 rotate about the axis of rotation 321 with substantially the same frequency, torque and power. The third configuration may be a reverse gear configuration, where the clutch 340 is configured in the closed position and the free-wheel coupling 385 may be inactive or configured to be switched off to allow the sun gear 334 to rotate in the opposite rotational direction as when in high-gear. In the reverse gear configuration, the sun gear 334 and the carrier 333 are connected, whereby the ring gear 331 (and input shaft 323), the carrier 333, and the plurality of planet gears 332 rotate about the axis of rotation 321 with substantially the same frequency, torque and power. However, each planet gear 332 is configured not to rotate about its axis of rotation 335. The ring gear 331 (and input shaft may input torque in the direction opposite to the rotational direction as when in high gear, thereby rotating the carrier 333, the plurality of planet gears 332 and the sun gear 334 in the opposite rotational direction (relative to high gear) as well.

The dual gear assemblies 20, 120, 220, 320 may be coupled to the output of a conventional transmission having a specified number of gear ratios, such as six gear ratios, so that a vehicle having this configuration would have as the total number of gear ratios, twice the number of gear ratios of the conventional transmission. For example, a vehicle having a conventional transmission with six gear ratios coupled to a dual gear assembly disclosed herein would have a total of twelve gear ratios. The increased number of gear ratios provide a vehicle with improved efficiency (e.g., fuel) and with improved power over a broader range of speeds. Accordingly, any transmission having any number of specified gear ratios may be coupled to a dual gear assembly as disclosed herein to provide such improvements. Additionally, the dual gear assemblies as disclosed herein may be coupled directly to the output from the engine, such as the driveshaft.

According to a disclosed embodiment, a gear assembly for a motor vehicle configured to provide more than one gear ratio for improved efficiency is provided. The gear assembly includes a housing for encasing the gear assembly and for providing coupling to the vehicle, an input shaft configured to receive an input torque, an output shaft configured to transfer an output torque, a planetary gear train, a linking member rotationally coupled to the input shaft, and first and second clutches coupled to the linking member. The input shaft and output shafts, as well as the linking member, are configured to rotate about an axis of rotation. The input shaft includes a first end configured to receive an input torque from a first vehicle component, and a second end configured to transfer torque. The output shaft includes a first end configured to transmit output torque to a second vehicle component, and a second end to receive torque. The planetary gear train is configured to provide gear-reduced (or increased) torque, and includes a ring gear having internal gear teeth, a sun gear having external gear teeth, a plurality of planet gears having external gear teeth, and a carrier having internal gear teeth. The external gear teeth of the plurality of planet gears engage the external gear teeth of the sun gear and the internal gear teeth of the ring gear substantially simultaneously. The linking member is rotationally coupled to the second end of the input shaft to receive input torque. The first clutch is configured to selectively couple the linking member to the output shaft to transmit torque. The second clutch is configured to selectively couple the linking member to the planetary gear train to transmit torque to the output shaft through the planetary gear train. When the first clutch is activate and the second clutch is not activated, the input torque is transmitted from the input shaft to the output shaft through the linking member, so that the output torque relative to the input torque is a first gear ratio. When the second clutch is activated and the first clutch is not activated, the input torque is transmitted from the input shaft to the output shaft through the planetary gear train, so that the output torque relative to the input torque is a second gear ratio. When neither the first clutch nor the second clutch are activated, the input torque is not transmitted from the input shaft to the output shaft.

According to another disclosed embodiment, a gear assembly for a motor vehicle configured to provide more than one gear ratio for improved efficiency is provided. The gear assembly includes a housing for encasing the gear assembly and for providing coupling to the vehicle; an input shaft configured to rotate about an axis of rotation to transmit torque, wherein the input shaft includes a first end configured to receive input torque from a first vehicle component and a second end configured to transmit torque; and an output shaft configured to rotate about the axis of rotation to transmit torque, wherein the output shaft includes a first end configured to transmit output torque to a second vehicle component and a second end configured to receive torque. The gear assembly also includes a planetary gear train configured to provide gear-reduced (or increased) torque, wherein the planetary gear train includes a ring gear having internal gear teeth, a sun gear having external gear teeth, a plurality of planet gears having external gear teeth, and a carrier having internal gear teeth. The external gear teeth of the plurality of planet gears engage the external gear teeth of the sun gear and the internal gear teeth of the ring gear substantially simultaneously. The gear assembly further includes a slide member configured to rotate about the axis of rotation and rotationally coupled to the second end of the input shaft to receive input torque, wherein the slide member is configured to slide between a first position and a second position in a sliding direction relative to the second end of the input shaft; and a synchronizer assembly rotationally coupled to the output shaft to transmit torque to the output shaft, wherein when the slide member is configured at the first position, the slide member engages the planetary gear train without engaging the synchronizer assembly to transmit torque from the input shaft to the output shaft through the slide member and planetary gear train, so that the output torque relative to the input torque is a first gear ratio. When the slide member is configured at the second position, the slide member engages the synchronizer assembly without engaging the planetary gear train to transmit torque from the input shaft to the output shaft through the slide member and the synchronizer assembly, so that the output torque relative to the input torque is a second gear ratio. When the slide member is configured between the first and second positions, the slide member neither engages the planetary gear train nor the synchronizer assembly, and the input torque is not transmitted from the input shaft to the output shaft.

According to another disclosed embodiment, a gear assembly for a motor vehicle configured to provide more than one gear ratio for improved efficiency is provided. The gear assembly includes a housing for encasing the gear assembly and an input shaft configured to rotate about an axis of rotation to transmit torque. The input shaft includes a first end configured to receive input torque from a first vehicle component and a second end configured to transmit torque. The gear assembly also includes an output shaft configured to rotate about the axis of rotation to transmit torque. The output shaft includes a first end configured to transmit output torque to a second vehicle component and a second end configured to receive torque. The gear assembly further includes a planetary gear train configured to receive torque from the second end of the input shaft, wherein the planetary gear train includes a ring gear connected to the input shaft and configured having internal gear teeth, a sun gear having external gear teeth, a plurality of planet gears having external gear teeth, and a carrier having internal gear teeth to transmit torque to the output shaft. The external gear teeth of the plurality of planet gears engage the external gear teeth of the sun gear and the internal gear teeth of the ring gear substantially simultaneously. The gear assembly also includes a linking member configured to selectively couple to the carrier of the planetary gear train through a clutch, wherein when the clutch is activated, the linking member and the carrier rotate together about the axis of rotation, and the input torque is transmitted from the input shaft through the planetary gear train to the output shaft, so that the output torque relative to the input torque is a first gear ratio. When the clutch is not activated, the carrier rotates relative to the linking member about the axis of rotation, and the input torque is transmitted from the input shaft to the output shaft through the planetary gear train to the output shaft, so that the output torque relative to the input torque is a second gear ratio.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the dual gear assemblies as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

The invention claimed is:

1. A gear assembly for a motor vehicle, comprising:
  an input shaft including a first end configured to receive input torque from a first vehicle component and a second end configured to transmit torque;
  an output shaft including a first end configured to transmit output torque to a second vehicle component and a second end configured to receive torque;
  a planetary gear train including a ring gear, a sun gear, a plurality of planet gears, and a carrier; and
  a slide member rotationally coupled to the input shaft to receive input torque;
  wherein the slide member is configured to slide between a first position and a second position in a sliding direction relative to the second end of the input shaft;
  wherein at the first position, the slide member engages the ring gear of the planetary gear train so that the slide member and ring gear rotate together to transmit torque from the input shaft to the output shaft through the slide member and planetary gear train such that the output torque relative to the input torque is a first gear ratio;

wherein at the second position, the slide member engages the output shaft without engaging the planetary gear train to transmit torque from the input shaft to the output shaft through the slide member such that the output torque relative to the input torque is a second gear ratio;

wherein when the slide member is between the first and second positions, the slide member engages neither the planetary gear train nor the output shaft, and the input torque is not transmitted from the input shaft to the output shaft.

2. The gear assembly of claim 1, further comprising a synchronizer assembly rotationally coupled to the output shaft and configured to selectively engage the slide member when the slide member is in the second position.

3. The gear assembly of claim 1, wherein the planetary gear train is configured to receive torque from the slide member through the ring gear when in the first position, and the planetary gear train is configured to output torque to the output shaft through the carrier.

4. The gear assembly of claim 3, wherein the carrier of the planetary gear train is integrally formed with the second end of the output shaft.

5. The gear assembly of claim 3, wherein the sun gear and planet gears have external gear teeth and the sun gear is fixed against rotation and the external gear teeth of the sun gear engage the external gear teeth of the plurality of planet gears.

6. The gear assembly of claim 5, wherein the external gear teeth of each planet gear also engage the internal gear teeth of the ring gear.

7. The gear assembly of claim 1, wherein each planet gear includes a pivot axis concentric to an aperture in the carrier allowing for rotation of each planet gear about its pivot axis relative to the carrier.

8. The gear assembly of claim 1, further comprising an actuator assembly configured to slide the slide member from the first position to the second position.

9. The gear assembly of claim 8, wherein the actuator assembly includes an actuator that couples to the slide member, such that movement of the actuator moves the slide member substantially the same distance.

10. The gear assembly of claim 9, wherein the actuator assembly includes a piston configured to induce a force on the actuator to move the actuator when activated.

11. The gear assembly of claim 9, wherein the actuator assembly includes a biasing member configured to impart a force in a direction opposing the force from the piston.

12. A gear assembly to be coupled to a transmission output for a motor vehicle, comprising:
an input shaft configured to rotate about an axis of rotation;
an output shaft configured to rotate about the axis of rotation;
a planetary gear train configured to receive torque from the input shaft, wherein the planetary gear train includes a ring gear connected to the input shaft, a sun gear, a plurality of planet gears, and a carrier configured to transmit output torque; and
a clutch configured to selectively couple the output shaft and the planetary gear train;
a linking member rotationally coupled to the input shaft to receive input torque from the input shaft, and configured to selectively couple to the clutch;
wherein when the clutch is activated, the output shaft and the carrier rotate together about the axis of rotation, and the input torque is transmitted from the input shaft through the planetary gear train to the output shaft, so that the output torque relative to the input torque is a first gear ratio;

wherein when the clutch is not activated, the carrier is decoupled from the output shaft but the sun gear is coupled to the output shaft, and the input torque is transmitted from the input shaft to the output shaft through the planetary gear train, so that the output torque relative to the input torque is a second gear ratio;

wherein the sun gear is selectively rotationally coupled to the linking member through a coupling that permits the sun gear to rotate relative to the linking member in only one direction; and wherein in a third configuration the clutch is activated, the coupling is in an inactive state permitting the sun gear to rotate in a reverse direction and the planet gears are held against rotation.

13. The gear assembly of claim 12 wherein the coupling has a first position that prohibits free rotation of the sun gear and a second position that allows the sun gear to rotate in said one direction.

14. The gear assembly of claim 12 wherein in a first configuration the clutch is not activated and the coupling is in its first position to provide said second gear ratio.

15. The gear assembly of claim 12 wherein in a second configuration the clutch is activated and the coupling is in its second position to provide said first gear ratio.

16. A gear assembly to be coupled to a transmission output for a motor vehicle, comprising:
an input shaft configured to rotate about an axis of rotation;
an output shaft configured to rotate about the axis of rotation;
a planetary gear train configured to receive torque from the input shaft, wherein the planetary gear train includes a ring gear connected to the input shaft, a sun gear, a carrier, and a plurality of planet gears carried by the carrier;
a linking member coupled to the output shaft and configured to be selectively coupled to the carrier;
a coupling configured to selectively couple the sun gear with the linking member; and
a clutch configured to selectively couple the output shaft and the planetary gear train, wherein in a first configuration the clutch is activated, the output shaft and the carrier rotate together about the axis of rotation, and the input torque is transmitted from the input shaft through the planetary gear train to the output shaft so that the output torque relative to the input torque is a first gear ratio; and
wherein in a second configuration the clutch is not activated and the sun gear is coupled to the output shaft via the coupling and the linking member, and the input torque is transmitted from the input shaft to the output shaft through the planetary gear train so that the output torque relative to the input torque is a second gear ratio.

17. The gear assembly of claim 16 wherein the sun gear is selectively rotationally coupled to the linking member through a coupling that permits the sun gear to rotate relative to the linking member in only one direction.

* * * * *